United States Patent
Brosseau

(10) Patent No.: US 7,665,797 B1
(45) Date of Patent: Feb. 23, 2010

(54) BRACED FAIRING FOR DRAG AND VIBRATION REDUCTION OF ROUND TUBING

(76) Inventor: Jon Andrew Brosseau, 1638 Randolph Pky., Los Altos, CA (US) 94024

( * ) Notice: Subject to any disclaimer, the term of this patent is extended or adjusted under 35 U.S.C. 154(b) by 0 days.

(21) Appl. No.: 12/215,267

(22) Filed: Jun. 26, 2008

(51) Int. Cl.
    *B62D 35/00* (2006.01)
(52) U.S. Cl. .................................. 296/180.1; 296/180.2
(58) Field of Classification Search .............. 296/180.1, 296/180.2, 180.4; 180/309, 903; 105/1.2; 454/2; 114/487; 244/37, 100 R, 103 R
    See application file for complete search history.

(56) References Cited

U.S. PATENT DOCUMENTS

| | | | |
|---|---|---|---|
| 4,021,069 A | 5/1977 | Hersh | |
| 4,027,836 A * | 6/1977 | Seibel | 244/103 R |
| 4,143,731 A * | 3/1979 | Haustein | 180/89.2 |
| 4,227,651 A | 10/1980 | Abe | |
| 4,245,862 A | 1/1981 | Buckley, Jr. | |
| 4,257,640 A | 3/1981 | Wiley | |
| 4,465,154 A | 8/1984 | Hinderks | |
| 4,665,691 A | 5/1987 | Eller | |
| 4,671,474 A | 6/1987 | Haslund | |
| 4,706,910 A | 11/1987 | Walsh et al. | |
| 4,822,067 A * | 4/1989 | Matsuo et al. | 280/152.1 |
| 4,904,015 A | 2/1990 | Haines | |
| 5,114,099 A | 5/1992 | Gao | |
| 5,190,342 A | 3/1993 | Marlowe et al. | |
| 5,374,013 A | 12/1994 | Bassett et al. | |
| 5,595,205 A | 1/1997 | Sirovich et al. | |
| 5,658,038 A | 8/1997 | Griffin | |
| 5,924,763 A * | 7/1999 | Daniels | 296/180.1 |
| 6,092,861 A * | 7/2000 | Whelan | 296/180.2 |
| 6,186,571 B1 * | 2/2001 | Burke | 296/3 |
| 6,412,853 B1 * | 7/2002 | Richardson | 296/180.1 |
| 6,837,536 B1 * | 1/2005 | Schwartz | 296/180.4 |
| 6,883,848 B1 * | 4/2005 | Iverson et al. | 296/3 |
| 7,051,524 B1 * | 5/2006 | Kraft | 60/324 |
| 7,216,923 B2 | 5/2007 | Wong et al. | |

* cited by examiner

*Primary Examiner*—Glenn Dayoan
*Assistant Examiner*—Gregory Blankenship

(57) ABSTRACT

An optimized aerodynamic drag and vibration reducing geometry is described for round cylindrical tubing or pipe exposed to a flow stream at right angles to its direction of travel. The base drag reduction of the tube or pipe is maximized by providing a shaped fairing which intersects the cylindrical tube at the point of would-be flow separation and by means of a turbulator strip along the leading edge of the fairing geometry at the juncture, ensures a smooth flow transition to avoid asymmetric vortices and large negative pressures from forming in the remainder of the wake flow. A direct application would be to improve fuel economy of a semi-tractor trailer vehicle with large exposed vertical exhaust pipes operating at freeway speeds. By reducing the wake turbulence behind the exhaust pipes, a secondary reduction of trailer fore body pressure drag will ensue. By lowering the wake turbulence, ambient noise levels into the tractor cab are reduced, as are reduced vibrations transmitted directly into the cab from the pipe mount.

5 Claims, 2 Drawing Sheets

FIG 2
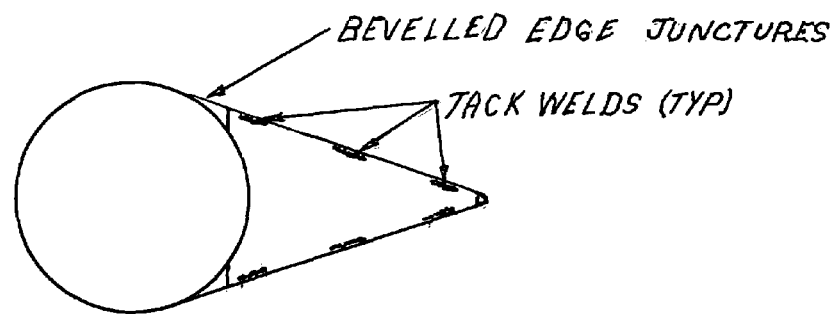
SECTION A-A  BRACED FAIRING
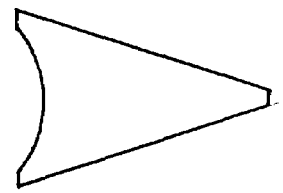
BRACE - SIDE VIEW
BRACE - TOP VIEW
SECTION B
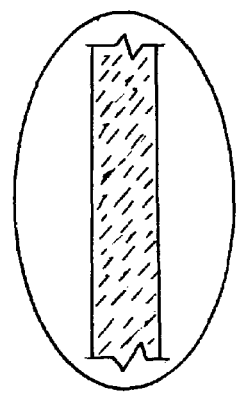
ROLL EMBOSSED STRIP
SECTION C
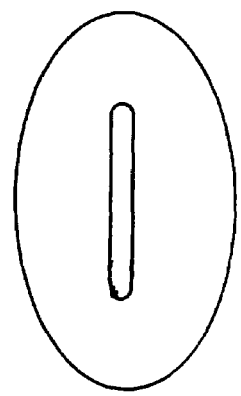
STRAP CLAMP SLOT

BRACED FAIRING FOR DRAG AND VIBRATION REDUCTION OF ROUND TUBING

BACKGROUND OF THE INVENTION

1. Field of the Invention

The present invention relates generally to the design of an aerodynamic drag and vibration reduction geometry for maximizing the reduction of drag and wake turbulence of an exposed cylindrical shape(s) mounted or configured on motor vehicles.

2. Discussion of the Prior Art

Numerous means have been sought to improve the overall fuel-efficiency of moving bodies, especially large trucks moving at freeway speeds. Recently classical aerodynamic shaping and streamlining have been made to the front, sides and top of large diesel-powered tractors to combat and reduce costly aerodynamic drag. The addition of these fairings to the tractors has helped to improve the overall fuel economy of the 1.5 plus million tractor fleet in use today within the United States trucking industry. Similar efforts at streamlining the trailers have been mentioned in prior art described here. Most have involved complex geometries and shapes, wake gas injection, wake vortex manipulation, etc., most of which, with the exception of front edge corner rounding, has not been viable or economical and, hence, not been adopted by the transportation industry as a whole.

While streamlining improvements to the tractors have resulted in better fuel economy, residual drag continues to be a costly problem. Within the United States truck fleet, not all tractors have submerged exhaust pipes (cylinders) within their top mounted fairings and streamlined cab enclosures.

In addition, the trend of having larger turbo-powered diesel engines power the tractors is resulting in more dual exhaust pipes and corresponding larger diameter pipes to improve exhaust flow. These exposed exhaust systems create significant direct drag to the tractor and by resulting turbulent wake flow formation, interference pressure drag to the upper frontal surface area of the trailer when traveling at the higher freeway speeds in use.

Any aerodynamic shaping and turbulence altering device which can reduce the exposed cylindrical drag to the tractor and the wake induced pressure drag on the trailer will result in a reduction of the current amount of fuel used in the transportation of commercial freight hauling.

Aerodynamic shaping of the braced fairing will by design correspondently reduce the tractor cab sound and vibration levels, making for an enhanced driver comfort level.

BRIEF DESCRIPTION OF THE DRAWINGS

The invention will be described and explained with sufficient detail through the use of the accompanying drawings in which:

FIG. 2, Section A-A, is a top view section of the exhaust pipe incorporating the outline of the fairing and internal brace formed in accordance with aspects of the present invention.

FIG. 2 also includes a side view detail (Sec. B) of the turbulator strip formed in accordance with aspect of the present invention.

FIG. 2 also shows a side view detail (Sec. C) of the mounting slot formed in accordance with aspects of the present invention.

DETAILED DESCRIPTION OF THE PREFERRED EMBODIMENTS

Figure 1:
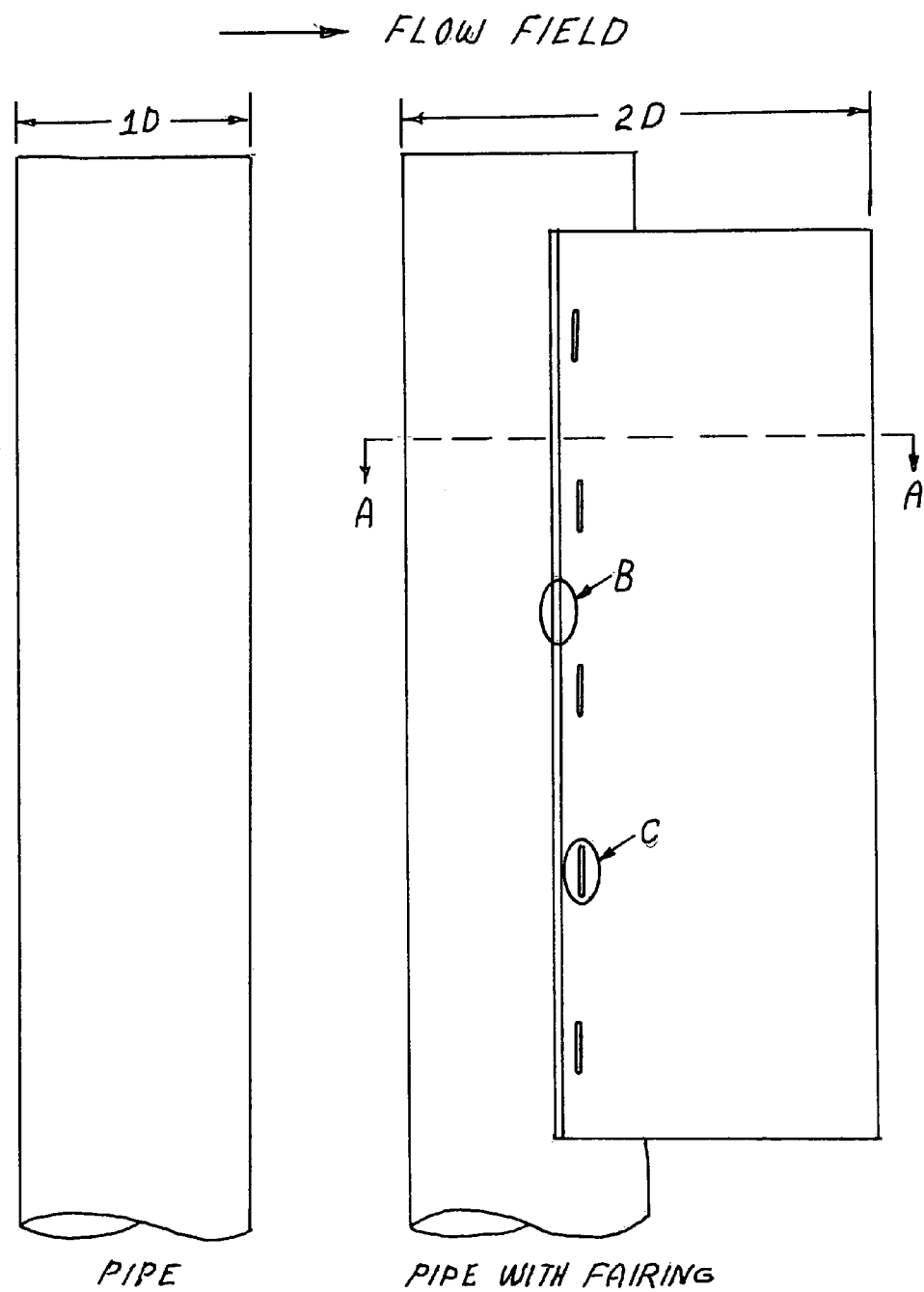
FIG. 1 shows two separate tractor exhaust pipes with a flow field going from left to right. On the left is a side elevational view of a single tractor exhaust pipe without a fairing, and on the right a pipe with an attached braced fairing, thereby providing a smooth converging surface to the aerodynamic flow field in accordance with aspects of the present invention. Specific sections are noted and further detailed in FIG. 2.

The present invention relates to a drag reduction device which can be quickly and easily retrofitted to the majority of diesel-powered exposed exhaust tractors in the United States freight transportation fleet, thus increasing vehicle efficiency, and thereby reducing fuel costs. The drag reduction system of the present invention offers a low cost modification which can, over a short period of time, return its cost back to the owner in fuel savings.

It should be noted that for purposes of this disclosure, the embodiments of this present invention should not be construed as limited to application of large tractor trailer combinations, but the invention should be considered illustrative in nature.

FIG. 1 shows the side view of a typical exposed exhaust shaped pipe, and to the right a braced fairing attached to the cylindrically shaped tractor exhaust pipe. The horizontal length of the fairing is sized to provide a contour of gradual slope starting aft of the maximum pipe diameter beginning where any unfaired pipe would develop turbulent instabilities in the flow field and begin to separate away from the aft portion of the pipe. The gradual slope ends in a small rounded edge wherein the flow joins the flow stream from the back side of the fairing in a smooth stable, well ordered stream line with little resulting base drag. A longer fairing is possible with this design and would give a slight gain in the overall pressure drag reduction but would increase the skin friction component of drag and result in a higher manufacturing cost for only a slight net gain in effectiveness. In the same manner, a shorter fairing can be considered, but the likelihood of lee side flow separation increases with small off axis flow angles of attack such as could be encountered in a crosswind driving condition. When flow separation in the wake occurs, any benefit of fairing drag reduction is lowered.

FIG. 2, Section A-A, illustrates a top section view of the braced fairing attached to the tractor exhaust pipe. The outline of the fairing's tapered shape can be observed, beginning with beveled edge junctures at the cylinder fairing interface so that no proturbance caused by the edge of the metallic fairing shell is presented to the flow stream. This embodiment of the fairing device is critical to the design as it minimizes any flow disturbance to the air as it begins its passage into the decreasing pressure realm aft of the pipe maximum radius. The junction bevel is the location of the embossed turbulator pattern shown in detail in Section B. The fairing shape tapers at a constant angle aft of the junction bevel, held in place by tack welds on either side with the internal brace(s), and ends in a small radius where the dividing streams meet in a smooth undisrupted flow, having not seen an adverse pressure gradient such as could induce flow separation with resultant formation of asymmetric vortices and an increased overall high base drag exerted on the exhaust pipe.

FIG. 2, Section B, shows in detail the turbulator pattern embossed upon the metallic shell of the fairing edge around the junction bevel. This embodiment of the invention as applied in this region is used to induce energy transfer within the inner portion of the boundary layer flow adjacent to the fairing, prior to the flow beginning the adverse pressure gradient progression incurred along the tapered portion of the fairing aft to the edged back. This energy transfer aids in the suppression of flow separation under conditions of adverse turbulence and/or slight yaw angles due to oncoming cross winds.

FIG. 2, Section C, shows in detail the fairing slots which are fabricated into the metallic shell to attach said shell into a conforming juncture with the cylindrical pipe. This embodiment of the invention comprises the location and width of the slot so that in conjunction with a metallic band strap a suitable tension can be exerted along the tapered junction bevel so as to maintain a close fit of the bevel to the cylindrical pipe. The tension also provides a forward force which serves to hold the fairing shell and specifically the internal radiused brace aligned and bound to the cylindrical pipe. The spacing of the fabricated slots are determined so as to strengthen the fairing and resist vibrational loads and dynamic pressure loads as may be present to the cylinder shell.

It is an embodiment of this invention that the strengthened streamlined shell fairing will reduce the base drag of the exposed tractor exhaust pipe(s) in such a manner that a resultant gain in overall transport fleet efficiency will occur.

It is an embodiment of this invention that the strengthened streamlined shell fairing acts as a flow damper to the turbulent flow air stream immediately aft of the tractor exhaust pipe(s) prior to said flow air stream impinging on the trailer. This flow damping will lessen the turbulence induced fore body pressure drag on the upper portion of the towed trailer and in addition to the tractor exhaust pipe drag reduction, result in a lowered fore body trailer drag and a resultant gain in overall transport fleet efficiency.

It is an embodiment of this invention that the streamlined shell fairing also acts, by reason of damping the turbulent flow on and aft of the tractor exhaust pipe(s), that an ensuing reduction of ambient acoustic sound energy and mechanical vibration transported into the interior of the tractor cab is reduced.

It will be apparent and appreciated that this braced fairing invention may be sold as a kit for installation on new vehicles built at the factory, for after-market shops that receive the fairing from the factory, or for retrofitting existing vehicles that desire the drag reducing benefits of the device described herein.

While the preferred embodiment of the invention has been illustrated and described herein, it will be appreciated that various changes can be made therein without departing from the spirit and scope of the invention.

The invention claimed is:

1. A vehicle comprising:
 a cylindrical exhaust pipe that travels in a flow steam at a right angle to a direction of travel of the vehicle when the vehicle is in motion, and
 a tapered fairing attached to a rear portion of the exhaust pipe aft of a region of maximum circulare radius to reduce base drag, the fairing has two flat edges adjacent the attachment to the exhaust pipe, wherein each flat edge has a sharpened ramp with an embossed turbulator pattern that prevents flow separation from the cylindrical exhaust pipe.

2. The vehicle of claim 1, wherein the tapered fairing further comprises:
 a plurality of generally triangularly-shaped braces that are spaced within the fairing and welded to the fairing, each triangularly-shaped brace has a front side that is shaped to conform exactly to the radius of the exhaust pipe, the tapered fairing is tapered with, a constant slope of each side in symmetry with a downstream axis of the exhaust pipe to a small rounded tip.

3. The vehicle of claim 1, wherein the tapered fairing further comprises:
 a series of rectangular slots near each leading edge in a direction aligned with a longitudinal axis of the exhaust pipe and located slightly aft of the turbulator pattern so as not to interfere with its flow transition property, wherein the rectangular slots permit attachment of the fairing to the exhaust pipe using scre-type clamps or metal straps in a manner so as to adjust the leading edges with its low ramp angle and embossed turbulator pattern to be snuggly joined and held in close contact with the exhaust pipe to reduce any geometric imperfections to smooth transition of the flow field around a region of maximum diameter of the cylinder.

4. The vehicle of claim 1, wherein the vehicle further comprises:
 a tractor and trailer attached to the tractor, the exhaust pipe is attached to the tractor, wherein the tapered fairing suppresses flow separation and reduces wake turbulence of the exposed exhaust pipe when the vehicle is operated at freeway speeds in low cross wind conditions, producing a corresponding residual reduction on upper forebody pressure drag of the trailer immediately behind the tractor.

5. The vehicle of claim 1, wherein the vehicle further comprises:
 a tractor and a trailer attached to the tractor, the exhaust pipe is attached to the tractor, wherein the tapered fairing reduces the exhaust pipe wake turbulence leading to a reduction of acoustic sound energy and mechanical vibration generated and transported to an interior of the tractor.

* * * * *